(12) United States Patent
Ono et al.

(10) Patent No.: US 7,393,004 B2
(45) Date of Patent: Jul. 1, 2008

(54) AIRBAG MODULE REMOVAL STRUCTURE

(75) Inventors: Kazumi Ono, Tokyo (JP); Tomiharu Yamada, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 234 days.

(21) Appl. No.: 11/131,329

(22) Filed: May 18, 2005

(65) Prior Publication Data

US 2005/0258623 A1 Nov. 24, 2005

(30) Foreign Application Priority Data

May 24, 2004 (JP) .............................. 2004-152679

(51) Int. Cl.
*B60R 21/016* (2006.01)
(52) U.S. Cl. .................. 280/728.2; 280/730.1; 280/732
(58) Field of Classification Search .............. 280/728.2, 280/732, 730.1
See application file for complete search history.

(56) References Cited

U.S. PATENT DOCUMENTS

| | | | | |
|---|---|---|---|---|
| 5,135,253 A | * | 8/1992 | Hirashima et al. | 280/732 |
| 5,482,313 A | * | 1/1996 | Ikeya et al. | 280/728.2 |
| 5,588,669 A | * | 12/1996 | Leonard et al. | 280/728.3 |
| 5,803,487 A | * | 9/1998 | Kikuchi et al. | 280/728.2 |
| 5,820,157 A | * | 10/1998 | Matsumoto | 280/728.2 |
| 5,848,803 A | * | 12/1998 | Tonooka et al. | 280/740 |
| 6,039,342 A | * | 3/2000 | Sasaki | 280/728.3 |
| 6,152,480 A | * | 11/2000 | Iwanaga | 280/728.3 |
| 6,250,669 B1 | * | 6/2001 | Ohmiya | 280/732 |
| 6,394,485 B1 | * | 5/2002 | Amamori | 280/728.2 |
| 6,406,056 B2 | * | 6/2002 | Yokota | 280/728.2 |
| 6,460,874 B1 | * | 10/2002 | McDonnell et al. | 280/728.2 |
| 6,601,870 B2 | * | 8/2003 | Suzuki et al. | 280/728.3 |
| 6,692,017 B2 | * | 2/2004 | Taoka et al. | 280/728.2 |
| 6,752,415 B2 | * | 6/2004 | Nelson et al. | 280/728.2 |
| 6,929,280 B2 | * | 8/2005 | Yasuda et al. | 280/728.2 |
| 7,007,970 B2 | * | 3/2006 | Yasuda et al. | 280/728.3 |
| 7,178,825 B2 | * | 2/2007 | Fujii et al. | 280/728.3 |
| 2001/0026063 A1 | | 10/2001 | Yokota | |
| 2001/0040365 A1 | | 11/2001 | Kitagawa | |
| 2004/0041379 A1 | * | 3/2004 | Hayashi | 280/732 |
| 2005/0140121 A1 | * | 6/2005 | Hayashi et al. | 280/728.3 |

FOREIGN PATENT DOCUMENTS

| EP | 1 547 877 A2 | 6/2005 |
|---|---|---|
| JP | 2001-206182 A | 7/2001 |

\* cited by examiner

*Primary Examiner*—Christopher Bottorff
*Assistant Examiner*—Timothy Wilhelm
(74) *Attorney, Agent, or Firm*—Foley & Lardner LLP

(57) ABSTRACT

An airbag module removal structure includes a pair of brackets which extends from an instrument panel and is disposed with a space to sandwich an airbag module, a first hook member secured to one side of the airbag module and a second hook member secured to the other side of the airbag module, and each of the first and second hook members includes an engagement part capable of being inserted into a hole provided in each of the brackets, and a clearance between the brackets and sizes of the engagement parts of the first and second hook members are set such that the first hook member is removed from the hole corresponding to the first hook member, and then the second hook member is removed from the hole corresponding to the second hook member.

2 Claims, 5 Drawing Sheets

AIRBAG MODULE REMOVAL STRUCTURE

TECHNICAL FIELD OF THE INVENTION

The present invention relates to an improvement in an airbag module removal structure.

RELATED ART STATEMENT

Conventionally, there has been known an airbag module structure for securing an airbag module to brackets such that the airbag module is sandwiched between the brackets extending from an instrument panel, and a plurality of hooks provided in the both sides of the airbag module is inserted into holes disposed in the brackets (reference to Japanese Patent Laid-Open 2001-206182).

Recently, there has been increasing demand for disassembling an airbag module in order to collect an inflator of the airbag module when a vehicle is disassembled. The conventional airbag module can be easily mounted onto the locking brackets of the resin lid portion of the instrument panel; however, it is hard to remove the airbag module from the instrument panel.

The present invention has been made in view of the above problem, and it is, therefore, an object of the present invention to provide an airbag module removal structure capable of removing an airbag module easily from an instrument panel.

According to one embodiment of the present invention, an airbag module removal structure comprises a pair of brackets which extends from an instrument panel and is disposed with a space to sandwich an airbag module, a first hook member secured to one side of the airbag module and a second hook member secured to the other side of the airbag module, wherein each of the first and second hook members includes an engagement part capable of being inserted into a hole provided in each of the brackets, and a clearance between the brackets and sizes of the engagement parts of the first and second hook members are set such that the first hook member is removed from the hole corresponding to the first hook member, and then the second hook member is removed from the hole corresponding to the second hook member.

DETAILED DESCRIPTION OF THE PREFERRED EMBODIMENT

Hereinafter, an embodiment of an airbag module removal structure according to the present invention will be described with accompanying drawings.

FIGS. 1 to 5 are explanation views respectively illustrating an airbag module removal structure according to the present invention. In FIGS. 1 to 5, a reference numeral 1 denotes a steering member, a reference numeral 2 denotes a resin lid portion of an instrument panel, a reference numeral 2a denotes a fragile groove formed inside the resin lid portion 2, a reference numeral 3 denotes an airbag module, and a reference numeral 4 denotes an inflator of the airbag module 3.

The resin lid portion 2 is provided with a pair of locking brackets 5, 6 spacing in the front and back direction of the vehicle. The locking brackets 5, 6 are provided with engagement holes 5a, 6a. A mounting bracket 7 is welded and secured to the steering member 1.

A case body 3A of the lower portion side of the airbag module 3 is provided with a mounted bracket 8. The mounted bracket 8 is secured to the mounting bracket 7 by a fixing bolt 9. A case body 3B of the upper portion side of the airbag module 3 is provided with side walls 3C, 3D in the front and back direction of the vehicle. A pair of the hook members 10, 11 is disposed in the side walls 3C, 3D. The hook member 10 is engageable with an engagement hole 5a, and the hook member 11 is engageable with an engagement hole 6a.

The distance in the front and back direction of the vehicle between a pair of the locking brackets 5, 6 is formed slightly larger than a size in the front and back direction of the vehicle of the case body 3B of the airbag module 3, and the case body 3B is located between a pair of the locking brackets 5, 6.

The hook member 10 comprises a fixed part 10a secured to the case body 3, a penetrating direction bending part 10b which is bended with respect to the fixed part 10a and extends in the direction penetrating the engagement hole 5a, and an engagement bending part 10c which is bended downwardly with respect to the penetrating direction bending part 10b and engages with the lower portion wall 5b of the locking bracket 5.

The hook member 11 comprises a fixed part 11a secured to the case body 3B, a penetrating direction bending part 11b which is bended with respect to the fixed part 11a and extends in the direction penetrating the engagement hole 6a, and an engagement bending part 11c which is bended downwardly with respect to the penetrating direction bending part 1b and engages with the lower portion wall 6b of the engagement bracket 6.

As illustrated in an enlarged view of FIG. 6, a size L1 in the up and down direction of the engagement hole 5a is about a size capable of removing the engagement bending part 10c from the engagement hole 5a when the airbag module 3 is lifted obliquely upward as shown by an arrow A1. A size L2 in the up and down direction of the engagement hole 6a is about a size capable of removing the engagement bending part 11c from the engagement hole 6a when turning the airbag module 3 as described below.

The airbag module 3 is secured by the steering member 1 and a pair of locking brackets 5, 6 such that the side wall 3C of the vehicle front side of the case body 3B becomes the upside and the side wall 3C of the vehicle back side of the case body 3B becomes the downside.

A size L3 of the penetrating direction bending part 11b is made to be larger than a size L4 of the penetrating direction bending part 10b, and a clearance H1 between the fixed part 11a and the locking bracket 6 is structured to be larger than a clearance H2 between the fixed part 10b and the locking bracket 5 with a state that the airbag module 3 is secured to the resin lid portion 2 of the instrument panel.

As shown in the partially enlarged view of FIG. 7, in the inner wall shape of the locking hole 5a of the locking bracket 5, the lower portion side of the inner wall of the locking hole 5a is formed with a taper face 5c in the pulling out direction such that the engagement bending part 10c does not hook into the inner wall of the locking hole 5a when the airbag module 3 is lifted obliquely upward to pull out the engagement bending part 10c from the locking hole 5a. In addition, the taper face 5c may be not only a liner inclined plane but also a curvature surface.

According to the airbag module removal structure, the fixing bolt 9 shown in FIG. 1 is removed, the airbag module 3 is lifted in the direction shown by the arrow A1 in FIG. 1, the airbag module 3 is shifted as shown by the arrow A2 in FIG. 2 such that the clearance H1 between the airbag module 3 and the locking bracket 6 becomes small to release the engagement between the locking bracket 5 and the hook member 10, the airbag module 3 is turned in the direction shown by the arrow A3 while maintaining the engagement between the locking bracket 6 and the hook member 11 as shown in FIG. 3, and the hook member 11 is pulled out from the engagement hole 6a as shown by the arrow A4 in FIG. 4. Ultimately, as illustrated in FIG. 5, the airbag module 3 can be easily removed from the vehicle by pulling out the airbag module 3 downwardly in the direction shown by the arrow A5 from the clearance between the steering member 1 and the locking bracket 6.

According to the above airbag module removal structure, the size of the penetrating direction bending part 11b of the hook member 11 of the vehicle back side is formed larger than the size of the penetrating direction bending part 10b of the hook member 10 of the vehicle front side, and the clearance H1 between the fixed part 11a of the hook member 11 of the vehicle back side and the locking bracket 6 for locking the hook member 11 of the vehicle back side is structured to be larger than the clearance H2 between the fixed part 10a of the hook member 10 of the vehicle front side and the locking bracket 5 for locking the hook member 10 of the vehicle front side, with a state that the airbag module 3 is secured to a pair of the locking brackets 5, 6. Therefore, the airbag module 3 can be shifted to the side of the locking bracket 6, which is the locking bracket 6 of the vehicle back side and is positioned lower than the locking bracket 5 of the vehicle front side, when releasing the engagement between the hook member 10 of the vehicle front side and the locking bracket 5 of the vehicle front side. Accordingly, the locking bracket 6 of the vehicle back side can receive the own weight of the airbag module 3 when releasing the engagement between the hook member 10 of the vehicle front side and the locking bracket 5 of the vehicle front side, so that an effort for removing the airbag module 3 can be reduced, and a facility of removing an airbag module can be further improved.

Moreover, in the above airbag module removal structure, when the airbag module 3 is shifted obliquely upward to pull out the hook member 10 of the vehicle front side from the locking hole 5a of the locking bracket 5 of the vehicle front side, the hook member 10 can be smoothly pulled out because the inner wall surface of the lower portion wall 5b constructing the engagement hole 5a is formed with the taper face 5c, in order to prevent the engagement bending portion 10c of the hook member 10 from hooking into the inner wall surface constructing the locking hole 5a of the locking bracket 5 of the vehicle front side.

According to the above airbag module removal structure in one embodiment of the present invention, the airbag module can be easily removed from the instrument panel; thus, the airbag module can be easily disassembled.

The patent disclosure relates to subject matter contained in previous Japanese Patent Application No. 2004-152679, filed on May 24, 2004, the content of which is herein expressly incorporated by reference in its entirety.

Figure 1:
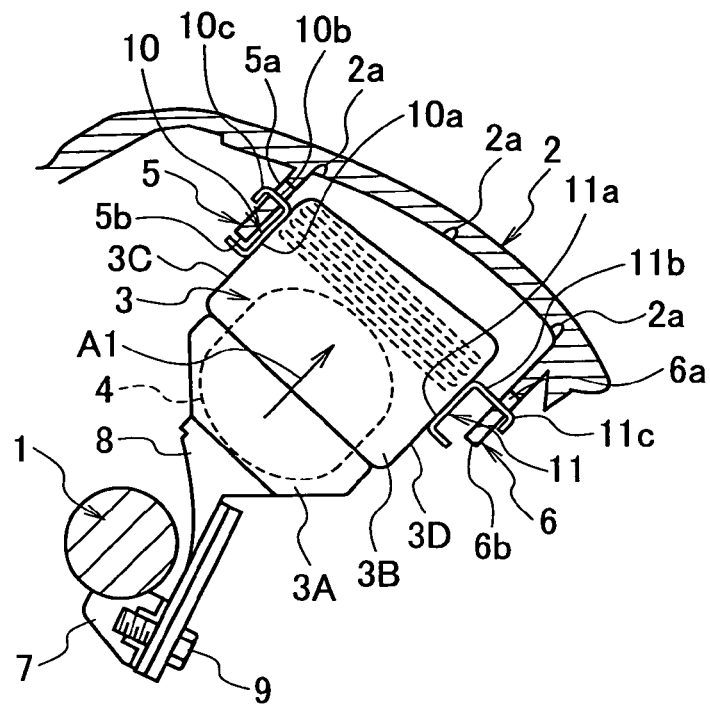
FIG. 1 is an explanation view illustrating one embodiment of an airbag module removal structure according to the present invention, and an explanation view showing a state that an airbag module is secured to a steering member and a locking bracket of a resin lid portion.
Figure 2:
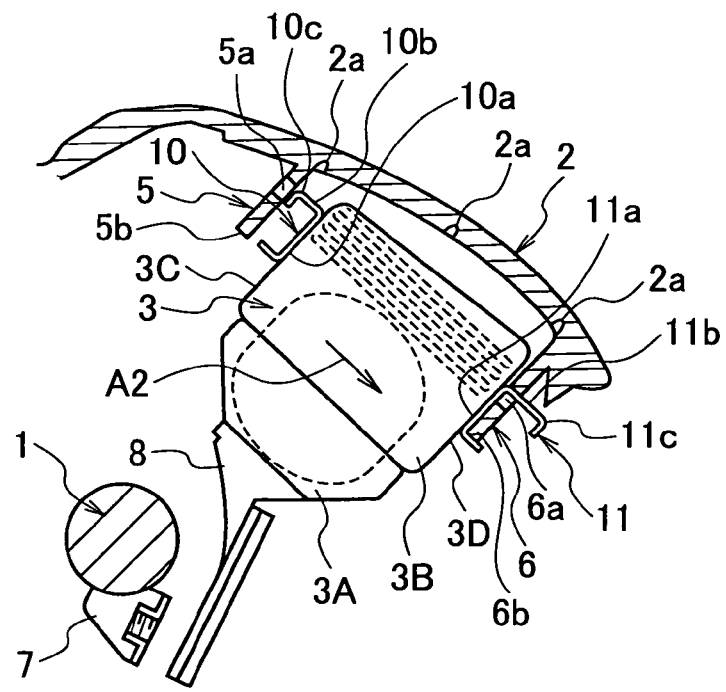
FIG. 2 is an explanation view illustrating a state that an engagement between a hook member of vehicle front side and an locking bracket of vehicle front side is released.
Figure 3:
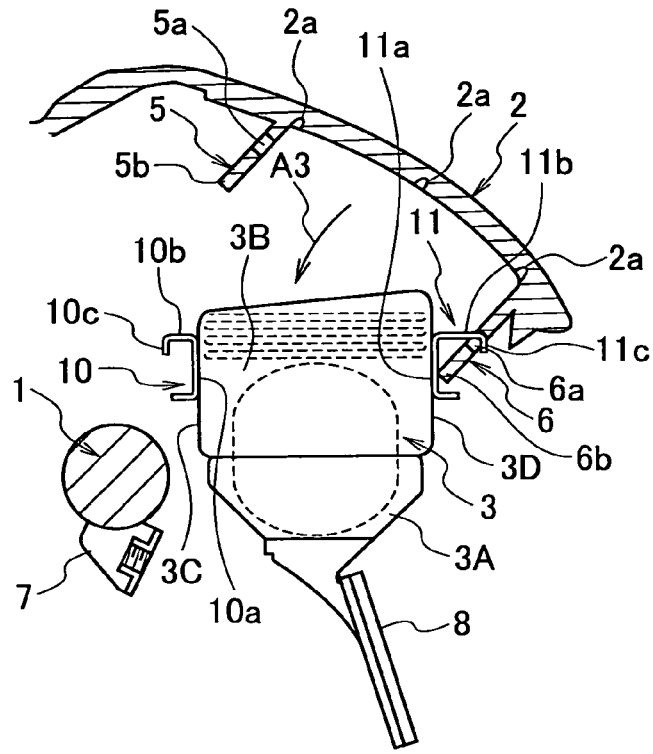
FIG. 3 is a view showing a state that an airbag module is downwardly turned while maintaining an engagement between a hook member of vehicle back side and a locking bracket of vehicle back side.
Figure 4:
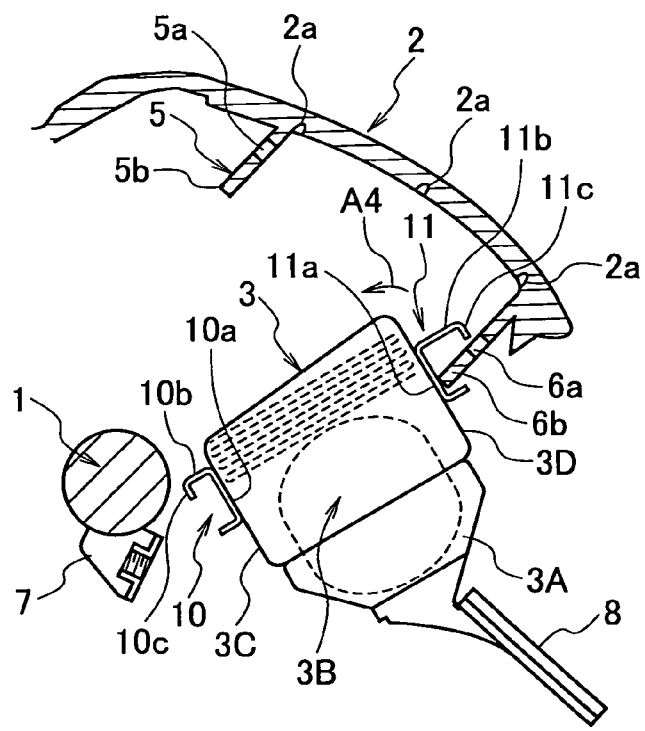
FIG. 4 is an explanation view showing a state just after the engagement between the hook portion of the vehicle back side and the locking bracket of the vehicle back side has released.
Figure 5:
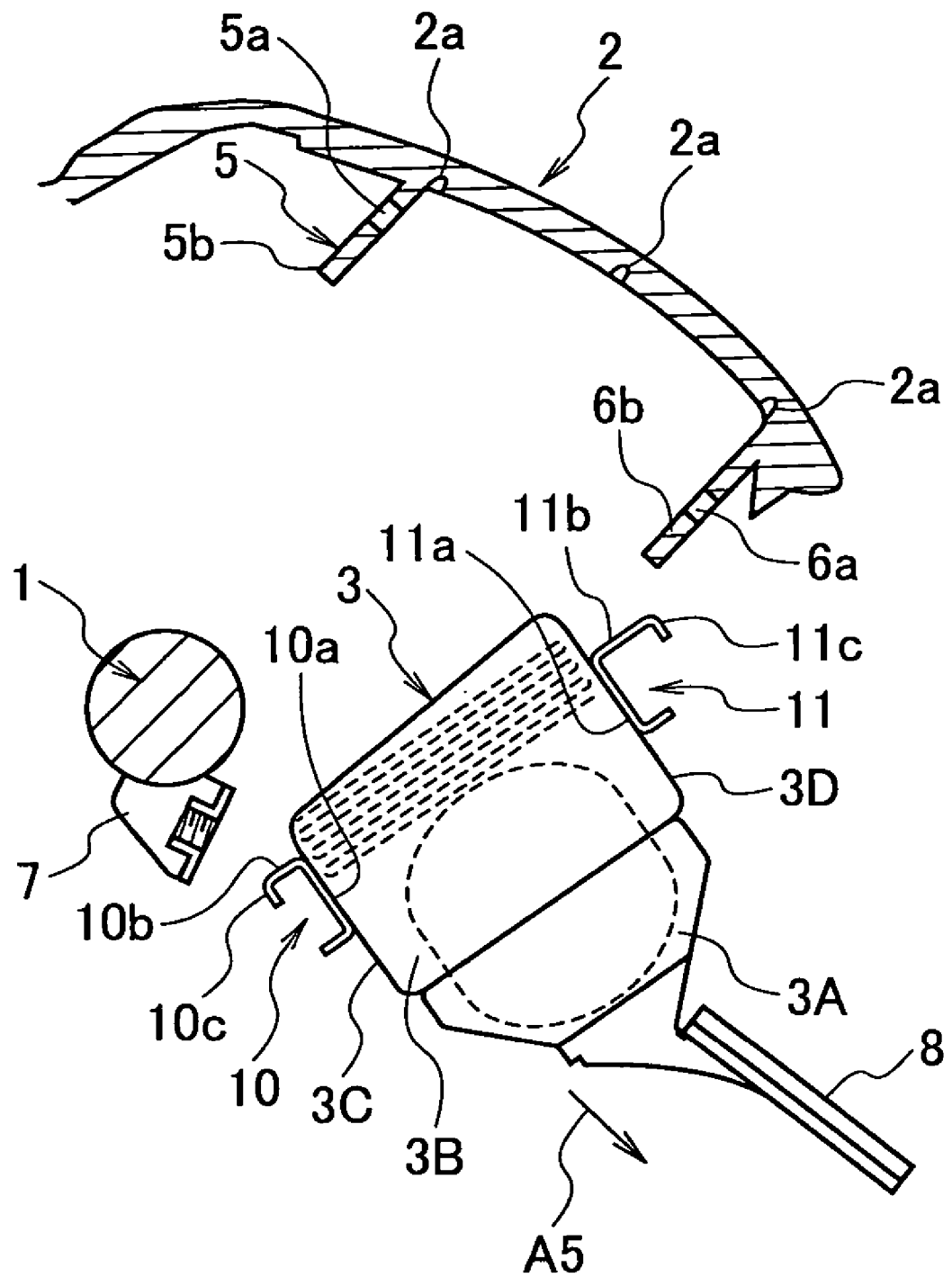
FIG. 5 is an explanation view illustrating a state that the airbag module is pulled out downwardly.
Figure 6:
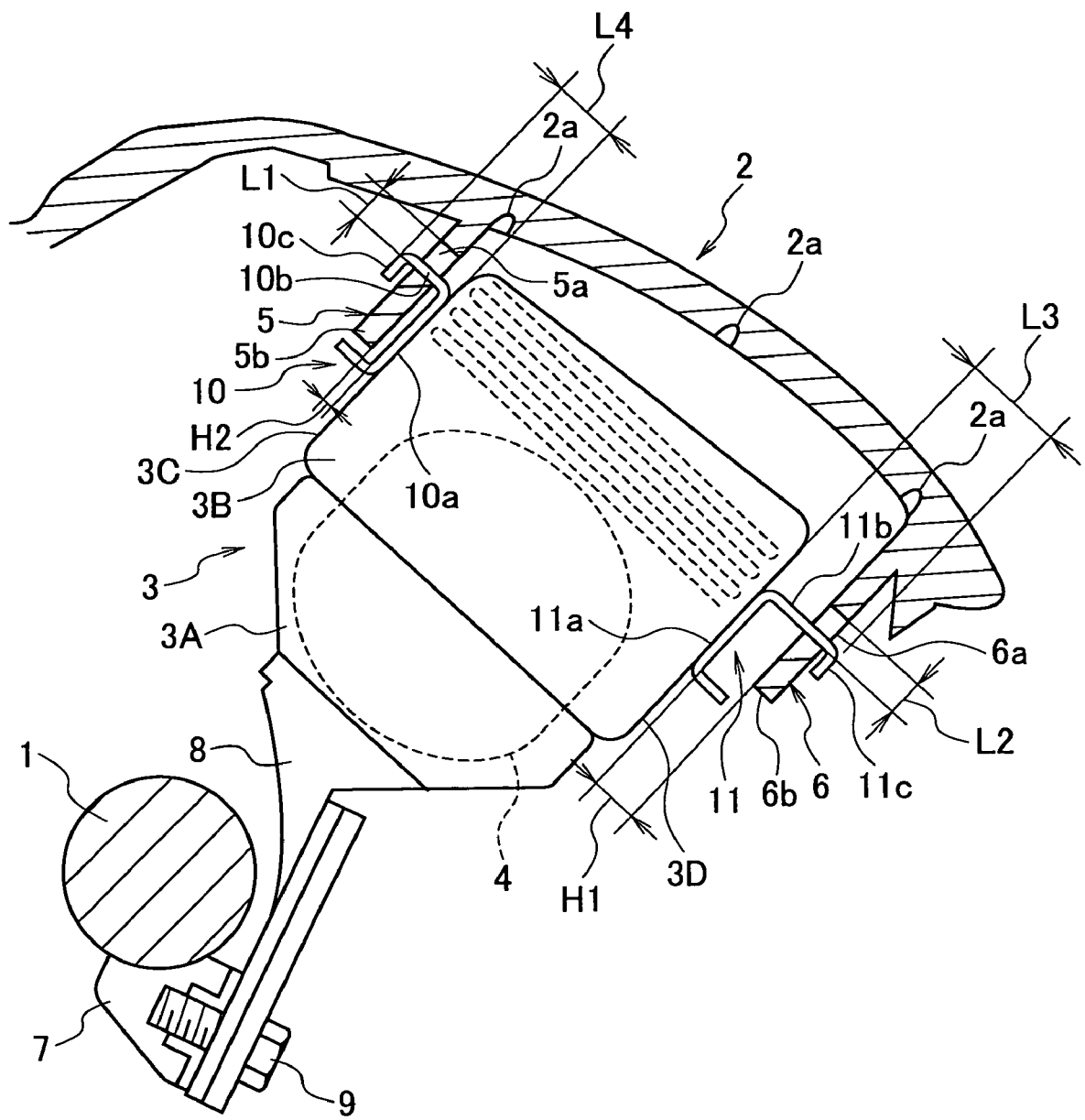
FIG. 6 is an enlarged explanation view showing a state that the airbag module shown in FIG. 1 is secured to the steering member and the locking bracket of the resin lid portion.
Figure 7:
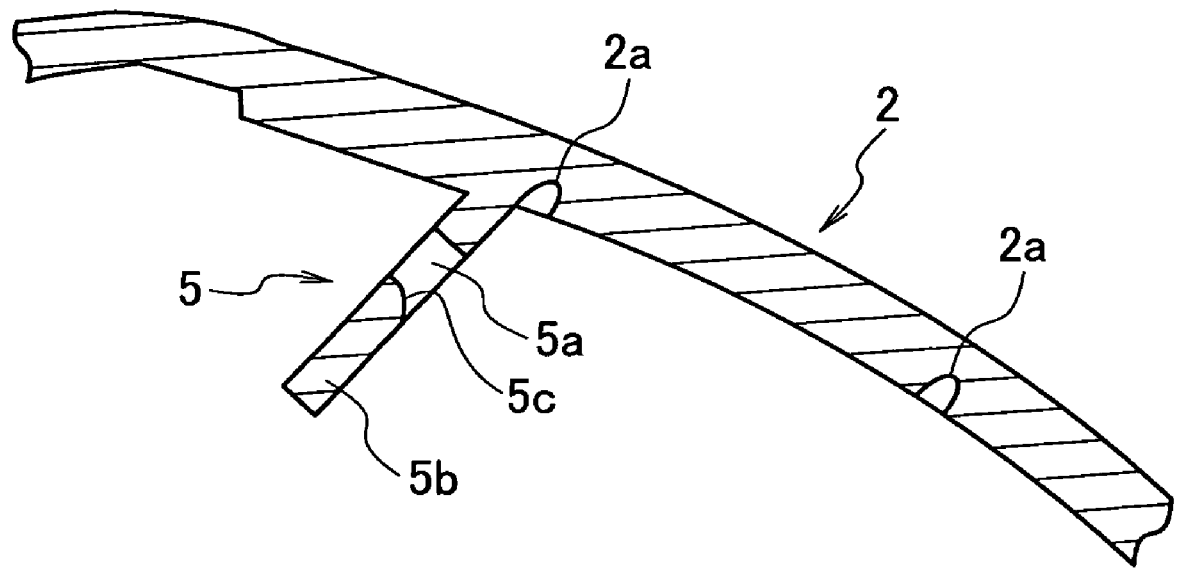
FIG. 7 is a partially enlarged view of the lid portion shown in FIG. 1.

What is claimed is:

1. An airbag module removal structure, comprising:
an airbag module having a lower portion side detachably secured to a steering member by a fixing bolt;
a pair of locking brackets provided in a resin lid portion of an instrument panel with a space; and
a pair of hook members provided in an upper portion side of the airbag module and locked to the locking brackets, wherein
each of the locking brackets includes an engagement hole to which each of the hook members is locked,
each of the hook members includes a fixed part, which extends along each of the locking brackets and is secured to the upper portion side of the airbag module, a penetrating direction bending part which is bended with respect to the fixed part and extends in a direction penetrating the engagement hole, and an engagement bending part which is bended downwardly with respect to the penetrating direction bending part, which substantially extends parallel to the fixed part along the locking bracket and engages with a lower portion wall of the locking bracket,
a size along an extending direction of the penetrating direction bending part of the hook member in one side of a vehicle in which the airbag module removal structure is located is formed larger than a size along the extending direction of the penetrating direction bending part of the hook member in the other side of the vehicle,
the engagement bending part of the hook member in the other side is penetrable to the engagement hole along a penetrating direction of the penetrating direction bending part,
a clearance between the fixed part of the hook member of one side of the vehicle and the locking bracket for locking the hook member of one side of the vehicle is larger than a clearance between the fixed part of the hook member of the other side of the vehicle and the locking bracket for locking the hook member of the other side of the vehicle, with a state that the airbag module is locked to the pair of the locking brackets, and the clearance between the fixed part of the hook member of one side of the vehicle and the locking bracket for locking the hook member of one side of the vehicle is larger than the size along the extending direction of the penetrating direction bending part of the hook member of the other side of the vehicle such that the engagement bending part of the hook member of the other side of the vehicle comes off from the engagement hole, with a state that the fixed part of the hook member of one side of the vehicle has contact with the locking bracket, and
a clearance between the fixed part and the engagement bending part of the hook member in the other side of the vehicle has a size substantially equal to a thickness of the locking bracket along the penetrating direction of the penetrating direction bending part into the engagement hole.

2. The airbag module removal structure according to claim 1, wherein an inner wall surface of a lower portion wall comprising the engagement hole is formed with a taper face in order to prevent the engagement bending part of the hook member from hooking into the inner wall surface comprising the engagement hole of the locking bracket of one side of the vehicle when the airbag module is lifted obliquely upward to pull out the hook member of one side of the vehicle from the engagement hole of the locking bracket of one side of the vehicle.

* * * * *